United States Patent [19]

Clayton

[11] Patent Number: 4,898,345
[45] Date of Patent: Feb. 6, 1990

[54] SKYBOARD

[76] Inventor: Dan Clayton, 8651 Foothill, No. 42, Rancho Cucamonga, Calif. 91730

[21] Appl. No.: 261,697

[22] Filed: Oct. 24, 1988

[51] Int. Cl.⁴ .................... B64C 31/00; B64D 17/78
[52] U.S. Cl. .................................. 244/4 A; 244/16; 244/138 R; 244/142; 441/74; 114/272
[58] Field of Search ............... 244/138 R, 144, 900, 244/4 A; 441/74, 79; 114/272, 273

[56] References Cited

U.S. PATENT DOCUMENTS 2,669,459  2/1954  Fleming ..................... 280/DIG. 13

FOREIGN PATENT DOCUMENTS 3321219  12/1984  Fed. Rep. of Germany ...... 114/272
2595954   9/1987  France ................................ 441/74

OTHER PUBLICATIONS

"Les Glisseurs Volants" *Ski Magazine* Mar.–Apr. 1988, p. 78.

Primary Examiner—Joseph F. Peters, Jr.
Assistant Examiner—Anne Sartelle
Attorney, Agent, or Firm—Thomas I. Rozsa

[57] ABSTRACT

A skyboard which is an apparatus using the combination of a specially designed surfboard and a parachute to enable the rider to ride the skyboard in a manner similar to the rider's positioning on a surfboard and which will enable the rider to ride the air currents of the sky in a much more exciting manner than through conventional gliders or hand gliders. The skyboard is a lightweight object formed in the general shape of a surfboard and which is modified to include at least a pair of front wings and a pair of rear wings on its lateral sides, a pair of fins on its underside and a pair of foot or shoe binders on its upper surface to accommodate and hold the rider's feet or shoes. The skyboard can be used as an air current surfing board to enable a rider to stand on the object and maneuver it with his feet in a manner similar to the maneuvering of a surfboard to cause the fins on the underside of the skyboard to catch and channel the air flow and give it and the rider lift, and to permit the pair of front side wings and rear side wings to give the skyboard stability and lift as it glides over the air currents.

17 Claims, 1 Drawing Sheet

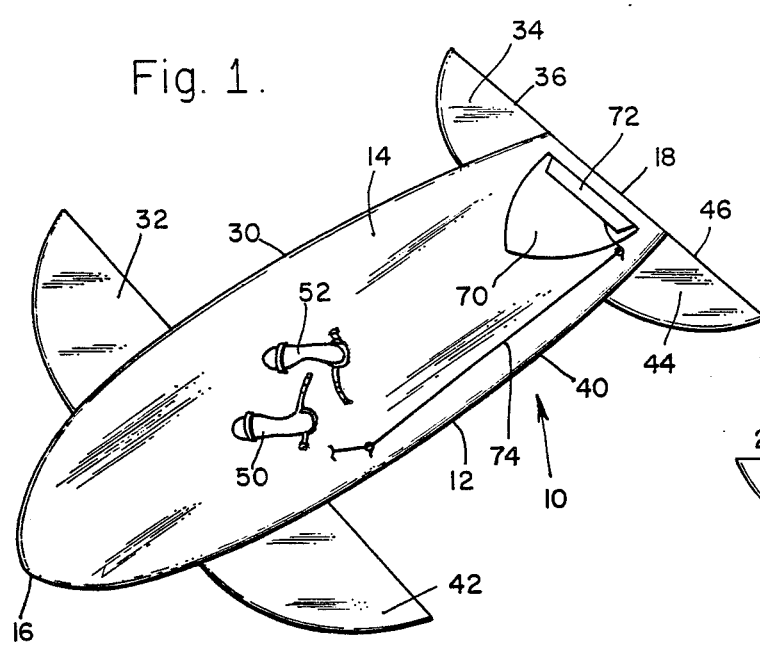
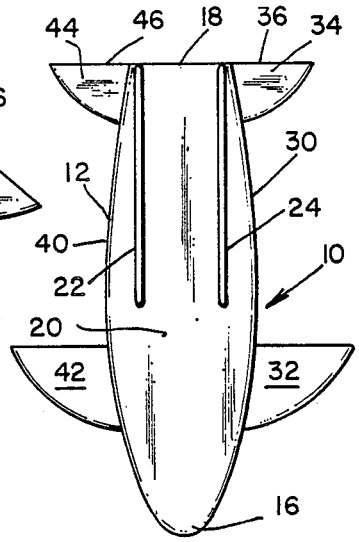
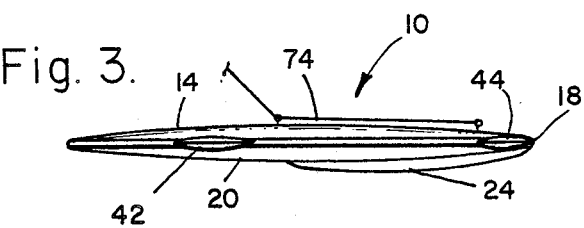
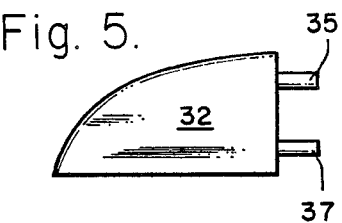
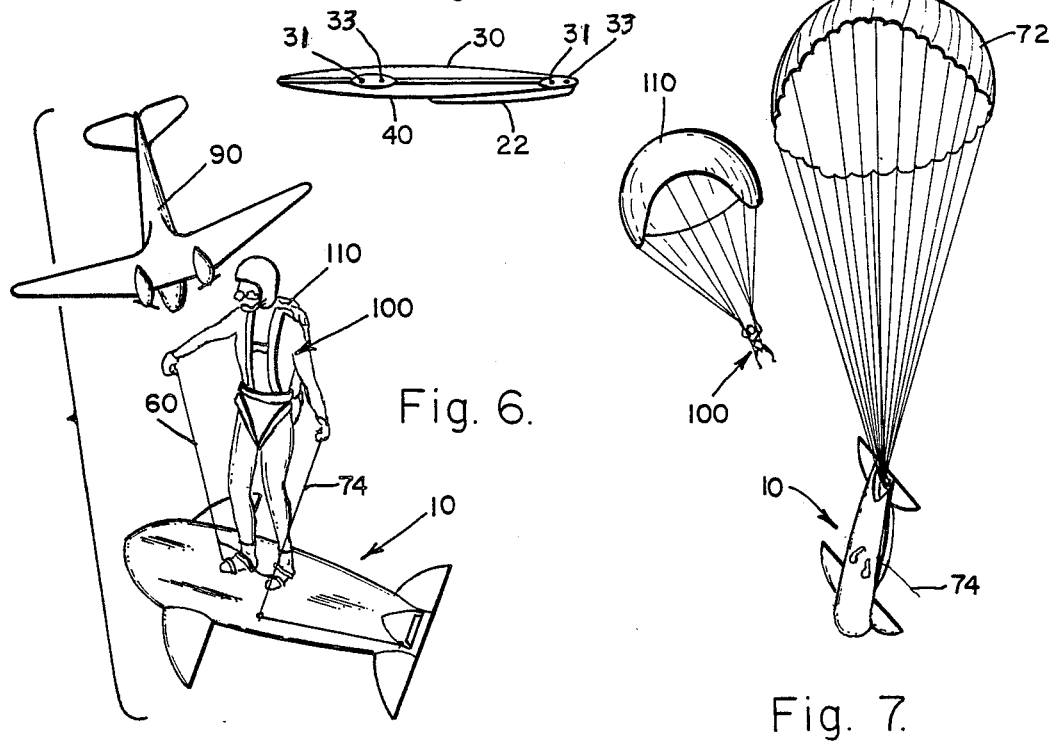

SKYBOARD

BACKGROUND OF THE INVENTION

1. Field of the Invention

The present invention relates to apparatus which are used for soaring in the sky by means of riding air currents. The present invention further relates to devices which enable a person to fly through the air by means of riding air currents.

2. Description of the Prior Art

In general, apparatus for riding the air currents are well known in the prior art. A conventional glider is a device in the shape of an airplane with the rider sitting inside the glider in a passenger compartment. The glider is taken into the air by being towed behind an airplane and then released so that the person can ride air currents and fly for an extended period of time until coming to a smooth landing. Hand gliders are winged devices in which the rider holds onto the bottom of a device which is in the shape of a wing and the wing is used to ride air currents. The hand glider is released from the top of a cliff and the person rides the air currents until coming to a smooth landing.

Surfboards are also well known in the prior art and are used to ride the waves of the ocean. The rider stands on top of the surfboard and guides the surfboard over the waves as they break.

Parachutes are also well known in the prior art. The user wears the parachute and jumps out of an airplane and glides to earth as the parachute is opened during an appropriate period of the descent.

While prior art devices such as gliders, hand gliders, parachutes and surfboards are known, no-one has ever combined these elements into a novel and exciting apparatus for riding the air currents. While a glider is fun, sitting in a glider is like sitting in an airplane. Hand gliders may be exciting, but supporting oneself by holding on with the user's arms is very tiring. There is no prior art device which combines the thrill of surfing with an apparatus for gliding and riding air currents rather than waves on an ocean. A significant need exists for such an apparatus which can provide many hours of recreational enjoyment.

SUMMARY OF THE PRESENT INVENTION

The present invention is a skyboard which is an apparatus using the combination of a specially designed surfboard and a parachute to enable the rider to ride the skyboard in a manner similar to the rider's positioning on a surfboard and which will enable the rider to ride the air currents of the sky in a much more exciting manner than through conventional gliders or hand gliders.

It has been discovered, according to the present invention, that if a lightweight object formed in the general shape of a surfboard and which we call a skyboard is modified to include at least a pair of front wings and a pair of rear wings on its lateral sides, a pair of fins on its underside and a pair of foot or shoe binders on its upper surface to accommodate and hold the rider's feet or shoes, then the skyboard can be used as an air current surfing board to enable a rider to stand on the object and maneuver it with his feet in a manner similar to the maneuvering of a surfboard to cause the fins on the underside of the skyboard to catch and channel the air flow and give it and the rider lift, and to permit the pair of front side wings and rear side wings to give the skyboard stability and lift as it glides over the air currents.

It has additionally been discovered, according to the present invention, that if the pair of front side wings and rear side wings are removably attached to the lateral sides of the skyboard, then the skyboard can be easily transported to the location of the airplane from which the skyboard and rider will be launched.

It has further been discovered, according to the present invention, that if the skyboard further comprises a parachute which can be triggered by the rider at any desired instant in time, then if the skyboard becomes unstable and the rider is forced to eject from the skyboard, the triggering of the parachute will enable the skyboard to come to a soft landing on earth so that it can be reused.

It has also been discovered, according to the present invention, that if the rider is also wearing a parachute while riding the skyboard, the supplemental parachute adds a safety feature to enable the rider to safely land independently of the skyboard in the event the skyboard becomes unstable and the rider must eject from the skyboard.

It is therefore an object of the present invention to provide a lightweight apparatus on which a rider can stand and which can be maneuvered by the rider after the object is launched from an airplane such that the object and rider can ride the air currents in the atmosphere.

It is a further object of the present invention to provide a gliding object on which a rider can stand to thereby provide the rider with an exciting gliding ride in which the rider's entire body is exposed to the atmosphere as the rider and object ride the air currents.

It is another object of the present to provide a gliding object for riding the air currents of the atmosphere which can be maneuvered in the fashion of a surfboard and provide the rider with a surfing ride in the sky.

It is a further object of the present invention to provide safety and escape means to permit the rider and the skyboard to independently land safely in the event of atmospheric turbulence or other problems which cause the skyboard to become unstable and require the rider to eject from the skyboard.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

FIG. 1 is a perspective view of the present invention skyboard.

FIG. 2 is a bottom plan view of the skyboard.

FIG. 3 is a side elevational view of the skyboard.

FIG. 4 is a partial side elevational view of the skyboard illustrating openings in the lateral side of the skyboard to accommodate a wing section.

FIG. 5 is a top plan view of a wing section illustrating the mating latches which are placed into mating openings in the lateral side of the skyboard.

FIG. 6 is a perspective view of a rider being ejected from an airplane and surfing the air currents while riding the skyboard.

FIG. 7 is a perspective view of a rider ejecting himself from the skyboard and parachuting toward the ground while the skyboard is also parachuting to the ground.

DETAILED DESCRIPTION OF THE PREFERRED EMBODIMENT

Although specific embodiments of the invention will now be described with reference to the drawings, it should be understood that such embodiments are by way of example only and merely illustrative of but a small number of the many specific embodiments which can represent applications of the principles of the invention. Various changes and modifications obvious to one skilled in the art to which the invention pertains are deemed to be within the spirit, scope and contemplation of the invention as further defined in the appended claims.

Referring to FIG. 1, there is illustrated at 10 the present invention skyboard. Referring to FIGS. 1 through 10, it can be seen that the skyboard 10 is essentially an elongated airfoil having a main body 12 which includes a curved upper surface 14 terminating in a rounded front nose 16 and a generally flat transverse rear end 18. The main body 12 also includes a lower surface 20 which is also curved and can form a mirror image of the upper surface 14. The main body 12 can be likened to a conventional surfboard in general shape. Attached to the lower surface 20 are a pair of spaced apart generally parallel fins 22 and 24. The fins 22 and 24 terminate adjacent the rear end 18 of the main body 12 and extend for a portion of the length of the lower surface 20 to approximately ¾ of the length. The fins 22 and 24 are designed to catch air which surrounds and flows around the fins. The fins cause the air and air currents to flow evenly on the underside of the skyboard. As can be seen from the side elevational view of FIG. 3, each fin is generally arcuate to provide a smooth surface under which and around which air currents can flow.

The main body 12 of skyboard 10 further comprises a first lateral side 30 and a second lateral side 40. First lateral side 30 supports a first front wing 32 and a first rear wing 34. First front wing 32 is removably attached to the first lateral side 30 and first rear wing 34 is removably attached to the first lateral side 30. One method of such removable attachment is illustrated in FIGS. 4 and 5. The portion of the lateral side 30 where each wing is attached comprises a pair of receiving openings 31 and 33. Each wing in turn further comprises a pair of attaching members 35 and 37 which by way of example can be forwardly protruding hook members. The attaching members 35 and 37 are on the face of the wing which lies adjacent the lateral side of the main body of the skyboard to which the wing is removably attached. In use, a respective attaching member is placed into a respective receiving opening in the lateral side and secured therein so that the wing is securely attached to the lateral side of the main body of the skyboard. It will be appreciated that each of the four wings of the skyboard can be removably attached in this manner. As can be seen from FIGS. 1 and 2, the first front wing 32 is attached so that its rests near the front of the skyboard. The first rear wing 34 is attached such that its rear end 36 is aligned with the rear 18 of the main body 12 of the skyboard 10. The opposite second lateral side 40 also supports a pair of wings. Second lateral side 40 supports a second front wing 42 and a second rear wing 44. Second front wing 42 is removably attached to the second lateral side 40 and second rear wing 44 is removably attached to the second lateral side 40. The method of removable attachment previously described is also used to removably secure the second front and rear wings to the second lateral side 40 of the main body 12. As can be seen from FIGS. 1 and 2, the second front wing 42 is attached so that its rests near the front of the skyboard. It is also positioned so that it creates a mirror image of the first front wing 32. The second rear wing 44 is attached such that its rear end 46 is aligned with the rear 18 of the main body 12 of the skyboard 10. It is also positioned so that it creates a mirror image of the first rear wing 34. Each of the four wings is generally in the shape of a conventional airfoil to provide both stability and lift to the skyboard. The wings provide additional lift and complement the fins on the underside of the main body of the skyboard to enable the skyboard to catch air currents as the skyboard glides through the air.

To describe the attachment means of each of the wings to a lateral surface of the main body in more general terms:

a. said first front wing includes attaching means for removably attaching the first front wing to the first lateral surface of the skyboard and said first lateral surface further comprises first front wing receiving means to receive the attaching means of the first front wing;

b. said first rear wing includes attaching means for removably attaching the first rear wing to the first lateral surface of the skyboard and said first lateral surface further comprises first rear wing receiving means to receive the attaching means of the first rear wing;

c. said second front wing includes attaching means for removably attaching the second front wing to the second lateral surface of the skyboard and said second lateral surface further comprises second front wing receiving means to receive the attaching means of the second front wing; and d. said second rear wing includes attaching means for removably attaching the second rear wing to the second lateral surface of the skyboard and said second lateral surface further comprises second rear wing receiving means to receive the attaching means of the second rear wing.

Attached to the upper surface 14 of the main body 12 are a pair of shoe bindings 50 and 52. The shoe bindings are similar to ski bindings in that they can releasably hold a rider's shoes or feet such that the rider is firmly positioned on the upper surface 14 of the main body 12 but can release the firm hold and fall free of the skyboard if necessary. The shoe bindings can release the rider's shoes or feet by an appropriate jerk from the rider or alternatively (referring to FIG. 6), can be released by a conventional triggering mechanism which is activated by triggering means 60 such as a cord attached to the release mechanism of the shoe bindings 50 and 52 and which can be pulled by the rider. When the rider pulls on the release mechanism 60, the shoe bindings release their grip on the rider's shoes and the rider can fall free of the skyboard. In the preferred embodiment, the shoe bindings 50 and 52 are located adjacent the center of gravity of the main body 12 to provide maximum stability as the rider stands on the skyboard. Adjacent the rear of the main body 12 is a parachute compartment 70 which is set within the main body 12 and opens up out of the upper surface 14. The parachute compartment 70 contains a folded parachute 72 which is attached to a triggering mechanism 74. The triggering mechanism can be a cord attached to the parachute and extending along the upper surface 14 of the main body 12, as illustrated in FIGS. 3 and 6.

In the preferred embodiment, the skyboard 10 including the main body 12, the wings 32, 34, 42 and 44, and the fins 22 and 24 are made of lightweight material such as fiberglass. Preferably, the material is also buoyant so that the skyboard can float in water if the rider lands the board in a body of water or if a free falling board (after the rider has ejected) lands in a body of water.

The skyboard in use is illustrated in FIG. 6. The skyboard 10 is placed into an airplane 90 comparable to the type of airplane used for parachute jumping. The skyboard 10 is positioned adjacent the opening of the airplane so that it can be ejected from the airplane after an appropriate altitude is reached. The rider 100 is positioned on top of the skyboard 10 such that a respective one of his feet are locked in the releasable shoe bindings 50 and 52. The rider 100 is also wearing a parachute 110. When the appropriate altitude is reached, an assistant pushes the skyboard 10 out of the airplane 90, with the rider 100 standing on the skyboard 10. An appropriate projecting mechanism can also be used to eject the skyboard and rider from the airplane. The skyboard 10 is then used to glide through the air and ride the air currents in the air, while the aerodynamic main body 12, the four wings 32, 34, 42 and 44, and the pair of underside fins 22 and 24 provide lift and stability. Since the shoe bindings 50 and 52 are preferably adjacent the center of gravity of the skyboard, the rider helps to stabilize the skyboard through his positioning. The rider 100 can stabilize the skyboard 10 by leaning his body forward or rearward or from side to side and also standing up or crouching downwardly, as appropriate, in order to affix the center of gravity of the skyboard and rider and to maneuver the skyboard to catch appropriate air currents.

In the most ideal situation, the rider 100 can cause the skyboard 10 to catch numerous air currents, in the manner of a glider, and can stay up in the air for an extended period of time and eventually glide safely to the ground. Since the skyboard 10 is made out of lightweight and preferably buoyant material such as fiberglass, if the launch from the airplane is made near a body of water such as the ocean or a very large lake, the rider 100 can glide onto the water for a safe landing.

Referring to FIG. 7, in the event turbulence in the air causes the skyboard to become unstable, the rider 100 can eject from the skyboard by triggering the shoe binding release mechanism 60 so that his feet are released from the shoe bindings 50 and 52 and skyboard 10 and the rider can free fall in the air. As the rider releases or ejects himself from the skyboard 10, he also triggers the skyboard parachute release mechanism 74 so that the skyboard parachute 72 is released from its compartment 70 and opens to permit the skyboard 10 to fall gently to earth. Once the rider is at a distance from the falling skyboard 10, the rider 100 triggers the rider's parachute 110 which he is wearing so that the rider can also fall safely to earth.

Through use of the present invention skyboard 10, the rider 100 can enjoy many happy hours gliding through the air in a much more exciting manner than with conventional gliders or hand gliders. The rider has the thrill of "surfing" the air currents. The skyboard can be of any desired length and width to accommodate child riders to adult riders, men and women, just as there are various sized surfboards to accommodate different sized riders. It will be appreciated that the skyboard is not limited to the precise shape illustrated in the drawings and can be of numerous aerodynamic shapes to provide stability and lift.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A skyboard, comprising:
    a. a main body having an upper surface, a lower surface, a first lateral side, a second lateral side, a front nose and a transverse rear edge;
    b. a pair of spaced apart generally parallel fins attached to the lower surface of the main body and extending for a portion of the length of the lower surface;
    c. a first front wing attached to the first lateral side of said main body and extending transversely therefrom;
    d. a first rear wing attached to the first lateral side of said main body and extending transversely therefrom;
    e. a second front wing attached to the second lateral side of said main body and extending transversely therefrom;
    f. a second rear wing attached to the second lateral side of said main body and extending transversely therefrom;
    g. a pair of shoe bindings attached to the upper surface of said main body;
    h. said main body further comprising a parachute compartment;
    i. a closed parachute within said parachute compartment and attached to said main body; and
    j. triggering means by which said parachute is released from said parachute compartment and caused to open.

2. A skyboard in accordance with claim 1 wherein said upper surface of said main body is curved, said front nose of said main body is rounded, and said transverse rear edge is generally flat.

3. A skyboard in accordance with claim 2 wherein the lower surface of said main body is curved and is a mirror image of said upper surface of said main body.

4. A skyboard in accordance with claim 1 wherein said pair of spaced apart generally parallel fins extend from adjacent the transverse rear edge to the approximately ¾ of the length of the lower surface of the skyboard.

5. A skyboard in accordance with claim 1 wherein each of said pair of spaced apart generally parallel fins is arcuate.

6. A skyboard in accordance with claim 1 wherein:

a. said first front wing includes attaching means for removably attaching the first front wing to the first lateral surface of the skyboard and said first lateral surface further comprises first front wing receiving means to receive the attaching means of the first front wing;
b. said first rear wing includes attaching means for removably attaching the first rear wing to the first lateral surface of the skyboard and said first lateral surface further comprises first rear wing receiving means to receive the attaching means of the first rear wing;
c. said second front wing includes attaching means for removably attaching the second front wing to the second lateral surface of the skyboard and said second lateral surface further comprises second front wing receiving means to receive the attaching means of the second front wing; and
d. said second rear wing includes attaching means for removably attaching the second rear wing to the second lateral surface of the skyboard and said second lateral surface further comprises second rear wing receiving means to receive the attaching means of the second rear wing.

7. A skyboard in accordance with claim 1 wherein said first front wing and said second front wing are attached near the front of the skyboard and are mirror images of each other.

8. A skyboard in accordance with claim 1 wherein said first rear wing and said second rear wing are attached such that their respective rear edges are aligned with the transverse rear edge of the main body, and the first and second rear wings are mirror images of each other.

9. A skyboard in accordance with claim 1 wherein said shoe bindings further comprise a releasing mechanism whereby a rider's shoes held by the shoe bindings can be released.

10. A skyboard in accordance with claim 1 wherein said shoe bindings are located adjacent the center of gravity of the skyboard.

11. A skyboard in accordance with claim 1 wherein the main body, the first and second front wings, the first and second rear wings, and the pair of fins are made of fiberglass.

12. A skyboard, comprising:
a. a main body having a curved upper surface, a curved lower surface, a first lateral side, a second lateral side, a rounded front nose and a generally flat transverse rear edge;
b. a pair of spaced apart generally parallel arcuate fins attached to the lower surface of the main body and extending for a portion of the length of the lower surface;
c. a first front wing removably attached to the first lateral side of said main body and extending transversely therefrom;
d. a first rear wing removably attached to the first lateral side of said main body and extending transversely therefrom;
e. a second front wing removably attached to the second lateral side of said main body and extending transversely therefrom;
f. a second rear wing removably attached to the second lateral side of said main body and extending transversely therefrom;
g. a pair of shoe bindings attached to the upper surface of said main body;
h. a releasing mechanism attached to the pair of shoe bindings;
i. said main body further comprising a parachute compartment;
j. a closed parachute within said parachute compartment and attached to said main body; and
k. triggering means by which said parachute is released from said parachute compartment and caused to open.

13. A skyboard in accordance with claim 12 wherein said pair of spaced apart generally parallel fins extend from adjacent the transverse rear edge to the approximately ¾ of the length of the lower surface of the skyboard.

14. A skyboard in accordance with claim 12 wherein said first front wing and said second front wing are attached near the front of the skyboard and are mirror images of each other.

15. A skyboard in accordance with claim 12 wherein said first rear wing and said second rear wing are attached such that their respective rear edges are aligned with the transverse rear edge of the main body, and the first and second rear wings are mirror images of each other.

16. A skyboard in accordance with claim 12 wherein said shoe bindings are located adjacent the center of gravity of the skyboard.

17. A skyboard in accordance with claim 12 wherein the main body, the first and second front wings, the first and second rear wings, and the pair of fins are made of fiberglass.

* * * * *